(12) United States Patent
Godwin

(10) Patent No.: US 11,704,168 B2
(45) Date of Patent: Jul. 18, 2023

(54) TEMPLATES FOR MAPPING DATA EVENTS TO API CALLS

(71) Applicant: Adobe Inc., San Jose, CA (US)

(72) Inventor: Duncan Richard Iain Godwin, Edinburgh (GB)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/230,944

(22) Filed: Apr. 14, 2021

(65) Prior Publication Data

US 2022/0334892 A1 Oct. 20, 2022

(51) Int. Cl.
*G06F 9/54* (2006.01)
(52) U.S. Cl.
CPC .................................. *G06F 9/541* (2013.01)
(58) Field of Classification Search
CPC ....................................................... G06F 9/541
See application file for complete search history.

(56) References Cited

U.S. PATENT DOCUMENTS

| 9,813,509 | B1* | 11/2017 | Visser | G06F 9/547 |
| 10,733,088 | B1* | 8/2020 | Sommers | G06F 11/3688 |
| 2010/0023952 | A1* | 1/2010 | Sandoval | G06F 16/258 |
| | | | | 707/E17.127 |
| 2010/0281311 | A1* | 11/2010 | Gao | H04L 63/168 |
| | | | | 714/49 |
| 2011/0161847 | A1* | 6/2011 | Chaikin | G06F 16/958 |
| | | | | 715/769 |
| 2015/0128103 | A1* | 5/2015 | Stratton | G06F 9/54 |
| | | | | 717/100 |
| 2019/0266287 | A1* | 8/2019 | Chen | G06F 16/3329 |
| 2022/0067292 | A1* | 3/2022 | Rastogi | G06F 3/167 |

OTHER PUBLICATIONS

"Amazon Kinesis Data Firehose", Amazon Web Services, Inc. [retrieved Mar. 18, 2021], Retrieved from the Internet <https://aws.amazon.com/kinesis/data-firehose/?kinesis-blogs.sort-by=item.additionalFields.createdDate&kinesis-blogs.sort-order=desc>., 10 pages.

* cited by examiner

*Primary Examiner* — Kevin L Young
*Assistant Examiner* — Phuong N Hoang
(74) *Attorney, Agent, or Firm* — FIG. 1 Patents

(57) ABSTRACT

Templates for mapping data events to API calls is leveraged in a digital medium environment. For instance, to enable communication between an event-driven architecture (EDA) system and an application programming interface (API) system, the described techniques utilize templates that enable EDA events to be mapped to API communications and API communications to be mapped to EDA events.

20 Claims, 16 Drawing Sheets

TEMPLATES FOR MAPPING DATA EVENTS TO API CALLS

BACKGROUND

Computing systems communicate with one another to perform a variety of different computing tasks, such as publishing and serving web pages, e-commerce, enterprise tasks, and so forth. To enable inter-system communication, different approaches and architectures are available. For instance, an event-driven architecture (EDA) such as Apache Kafka® communicates system state changes in the form of structured events. Events, for example, are consumed by systems that utilize state changes identified by the events for various purposes. Generally, events are typically loosely coupled in design such that different systems receiving a particular event are able to interpret the particular event in different ways and/or for different purposes.

Another architecture for inter-system communication utilizes an application programming interface (API) that defines interactions between systems such as hardware systems, software systems, and combinations thereof. An API, for example, defines the kinds of calls and/or requests that are allowed, how to make them, the data formats that are to be used, the communication conventions to be followed, and so forth. In contrast to an EDA, inter-system communication via an API is typically tightly bound to a particular implementation such that participating systems are to closely adhere to a particular API definition to enable successful inter-system communication utilizing the API.

Generally, this difference in implementation between an EDA and an API complicates the notion of intercommunication between a system utilizing EDA events and another system that utilizes API-based communication. Accordingly, different solutions have been developed to enable inter-system communication between EDA-based systems and API-based systems. For instance, intermediary applications have been developed that utilize execution of custom code to consume events from EDA systems, implement corresponding API calls based on the events, and communicate results from API calls back to the EDA systems. Such application-based solutions, however, suffer from a number of drawbacks. For instance, each event type typically utilizes a different application for each API, resulting in the creation of very large numbers of custom applications that are continually maintained and updated over the life of the applications. This is not only burdensome on user experience for personnel tasked with generating and maintaining applications, but also on system resources utilized to generate, store, execute, and maintain the applications. Further, by utilizing executable code, such intermediary applications present vulnerability points that are susceptible to security exploits. Accordingly, utilizing applications to enable EDA-API communication is not only system resource intensive but presents security risks to participating systems.

SUMMARY

Templates for mapping data events to API calls is leveraged in a digital medium environment. For instance, to enable communication between an event-driven architecture (EDA) system and an application programming interface (API) system, the described techniques utilize templates that enable EDA events to be mapped to API communications and API communications to be mapped to EDA events.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
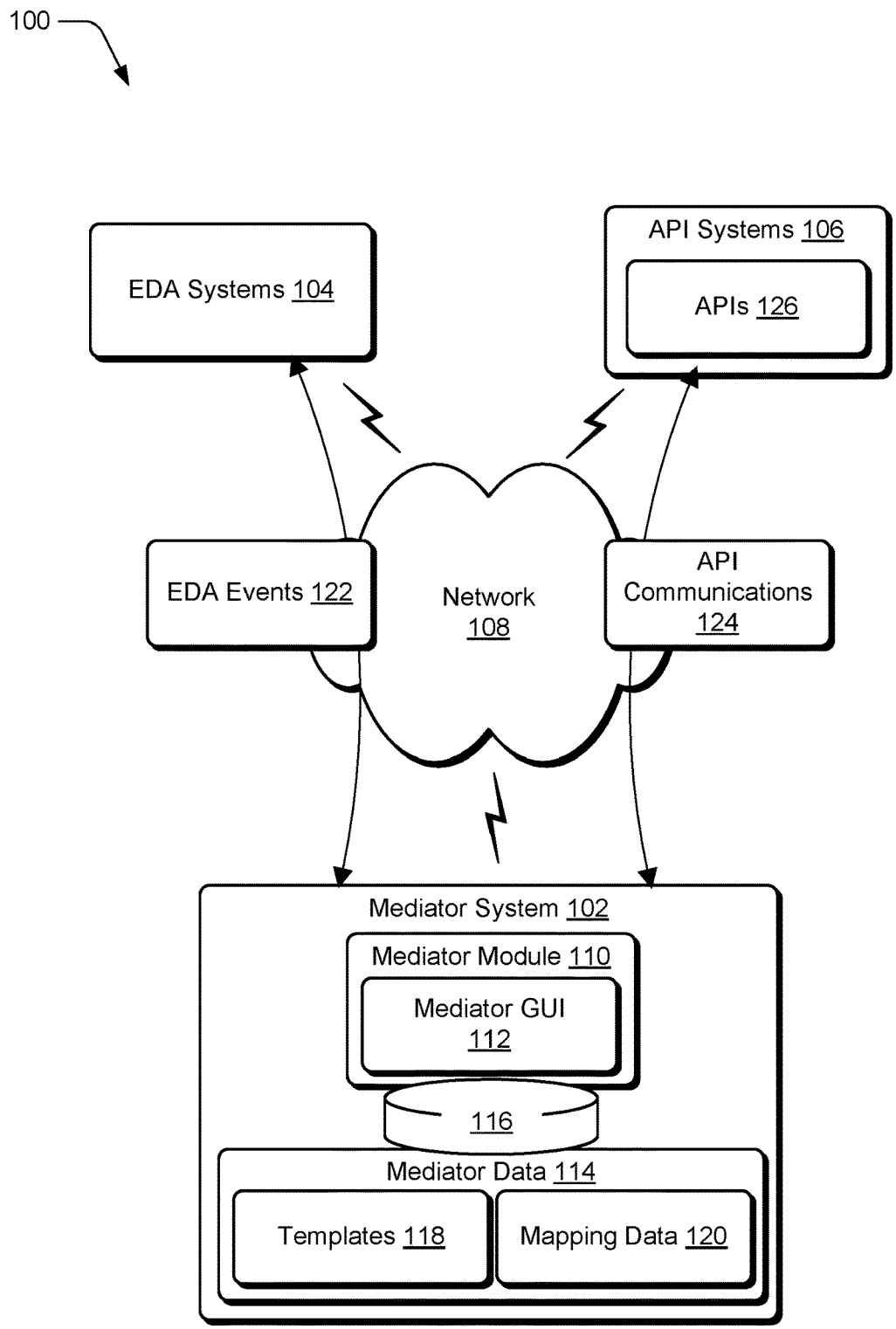
FIG. 1 is an illustration of an environment in an example implementation that is operable to employ techniques described herein.

To overcome the challenges to inter-system communication presented in conventional systems, templates for mapping data events to application programming interface (API) calls is leveraged in a digital medium environment. For instance, to mitigate the challenges of excessive burden on system resources and security exposures experienced when utilizing executable code (e.g., applications) for inter-system communication, the described mediator system implements inter-system communication techniques that reduce resource usage (e.g., memory and processor usage) and limit security exposures in comparison with conventional techniques.

Consider, for example, an implementation in which an event-driven architecture system ("EDA system") generates a request data event ("request event") that indicates a request to perform a particular computational action, such as writing data to a particular storage location, retrieving data from a storage location, updating a data record, and so forth. The EDA system communicates the request event to a mediator system that processes the request event to generate an API call based on the request event. The request event, for example, is in a format that is not suitable for implementing an API call to an API system. To generate an API call based on the request event, the mediator system identifies an API template based on the request event and/or an API to be called. The API template, for example, is identified based on a request type for the request event, an identity of an API to be called to perform the requested action, an identity of an API system that implements the API, and so forth. Generally, the mediator system maintains a variety of different templates that are usable for different types of requests and/or API calls.

The mediator system then applies the API template to the request event to generate the API call. Generally, the API template specifies which content from the request event is to be extracted and how the content is to be formatted in the API call. In at least one implementation, the API template includes subtemplates that each correlate a particular section of the request event to a particular section of the API call. Thus, the mediator system applies the subtemplates to populate content from the request event to the API call. The mediator system communicates the API call to an API system, and the API system utilizes the API call to invoke an API and to perform an action specified by the API call.

Based on a result of the API call, the API system generates an API response that indicates the result of the API call, such as whether the API call was successful. The API system communicates the API response to the mediator system and the mediator system applies a response template to the API response to generate a response event. The response template, for example, specifies how content from the API response is to be extracted and formatted to generate the response event. The API response, for example, is in a format that is not compliant with an event format utilized by the EDA system that generated the original request event. Accordingly, the mediator system utilizes the response template to reformat content from the API response into a response event that is compliant with an event format utilized by the EDA system. In at least one implementation, the response template is implemented as part of a data object that includes the API template utilized to generate the API response. The mediator system then communicates the response event to the EDA system to enable the EDA system to determine, based on the response event, a result of executing the request from the original request event.

Accordingly, techniques for templates for mapping data events to API calls overcome the deficiencies of traditional techniques for inter-system communication. For instance, by utilizing templates for transforming events into API calls and API responses into events, memory, processor, and storage resources are conserved in contrast with conventional techniques that utilize custom executable code for. Further, by avoiding the use of executable code, security vulnerabilities are avoided that are experienced in conventional techniques. In this way, computationally efficient mapping of data events to API calls provided by the described techniques is leveraged to reduce resource wastage and security exposure experienced in conventional systems.

In the following discussion, an example environment is first described that employs the techniques described herein. Example scenarios and procedures are then described which are performable in the example environment as well as other environments. Performance of the example scenarios and procedures is not limited to the example environment and the example environment is not limited to performance of the example scenarios and procedures. Finally, an example system and device are described that are representative of one or more computing systems and/or devices that are able to implement the various techniques described herein.

Example Environment

FIG. 1 is an illustration of an environment 100 in an example implementation that is operable to employ templates for mapping data events to API calls as described herein. The illustrated environment 100 includes a mediator system 102 that is leveraged to implement techniques for templates for mapping data events to API calls described herein. The environment 100 further includes EDA systems 104 and API systems 106 for which the mediator system facilitates various intercommunication tasks. The mediator system 102, the EDA systems 104, and the API systems 106, for example, are interconnected via a network 108 and thus are configured to communicate with one another to perform various aspects of templates for mapping data events to API calls described herein. Generally, the network 108 represents a combination of wired and wireless networks and is implemented via any suitable architecture. This is not to be construed as limiting, however, and the mediator system 102 is implementable to reside locally on a particular EDA system 104 and/or a particular API system 106.

Examples of computing devices that are used to implement the mediator system 102, the EDA systems 104, and the API systems 106 include a desktop computer, a laptop computer, a mobile device (e.g., assuming a handheld configuration such as a tablet or mobile phone), a server device, and so forth. Additionally, the mediator system 102 is implementable using a plurality of different devices, such as multiple servers utilized by an enterprise to perform operations "over the cloud" as further described in relation to FIG. 14.

The mediator system 102 includes a mediator module 110 that is representative of functionality to enable various aspects of templates for mapping data events to API calls discussed herein. Accordingly, the mediator module 110 implements a mediator graphical user interface (GUI) 112 which represents functionality for receiving user interaction to perform various actions to operate the mediator system 102, as well as to output visual indications of operation of the mediator system 102.

The mediator system 102 further includes mediator data 114 stored on a storage 116. Generally, the mediator data 114 represents data that is utilized for operation of the mediator system 102. The mediator data 114, for instance, includes templates 118 and mapping data 120. The templates 118 represent data that enables conversion between EDA events 122 from the EDA system 104 and API communications 124 to the API systems 106. The mediator module 110, for example, takes structured data from the EDA events 122 and applies the structured data to the templates 118 to populate the data to different API communications 124 to APIs 126 of the API systems 106. As further detailed below, the mediator module 110 is also able to convert API responses from the API systems 106 into a form that is understandable by the EDA systems 104. The mapping data 120 represents data that is usable by the mediator module 110 to ascertain which of the templates 118 to utilize for particular EDA events 122 and API calls to particular APIs 126. For instance, for a particular EDA event 122 that seeks to invoke a particular API 126, the mapping data 120 identifies an instance of a template 118 that is utilizable to convert the EDA event 122 into a corresponding API call to the particular API 126. In at least one implementation the API system 106 implements a Representational State Transfer (REST) endpoint and the APIs 126 include REST APIs.

Having considered an example environment and system, consider now a discussion of some example details of the techniques for templates for mapping data events to API calls in a digital medium environment in accordance with one or more implementations.

Implementation Details

Figure 2A:
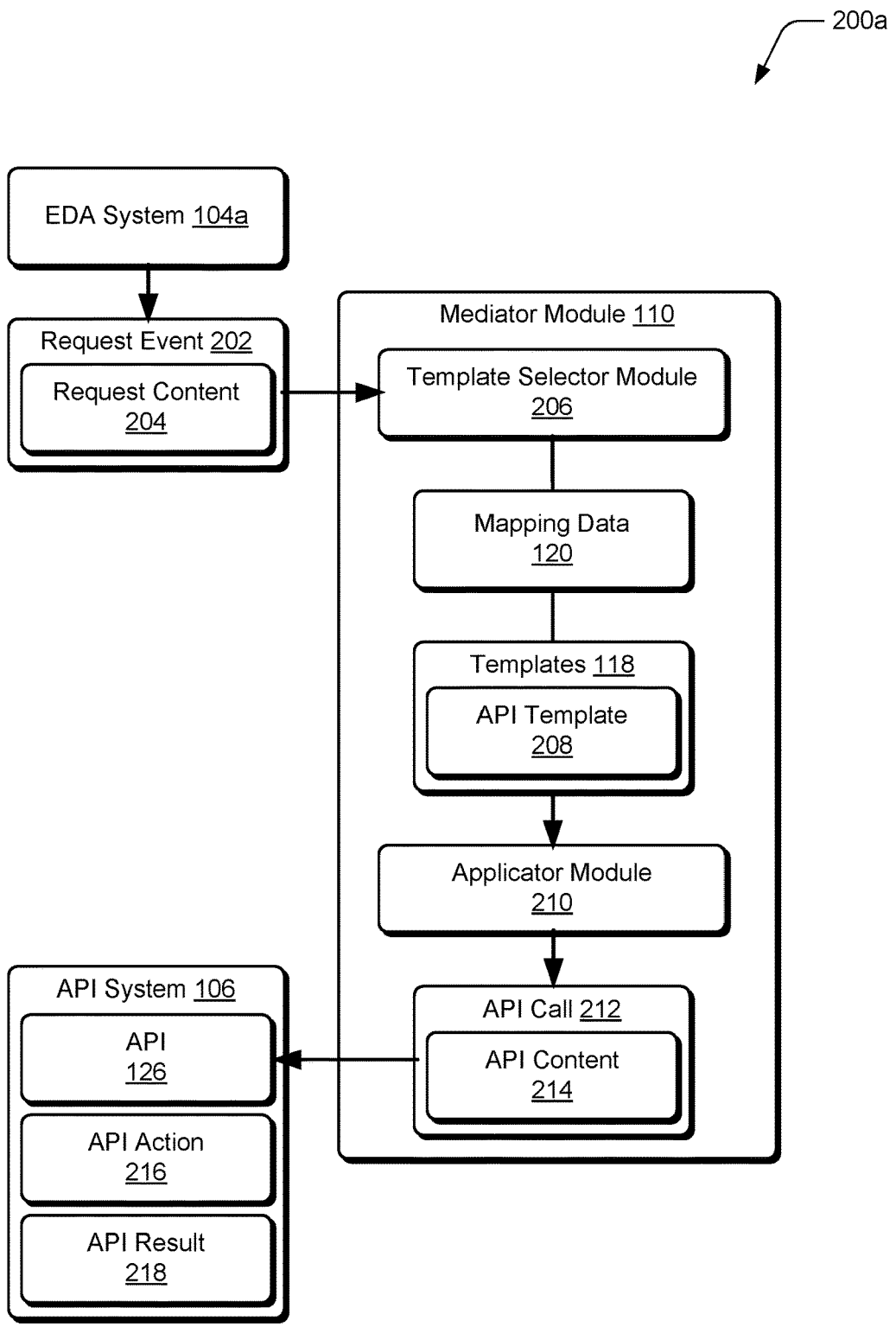
FIG. 2a depicts an example system for converting an event into a corresponding API call.

FIGS. 2a-8b depict different implementation details for templates for mapping data events to API calls in accordance with one or more implementations. For instance, FIG. 2a depicts an example system 200a for converting an event into a corresponding API call according to the techniques described herein. The system 200a, for example, describes implementation of the mediator module 110 via various modules that perform different operations. Generally, the various modules discussed herein are implementable in hardware, firmware, software, and/or combinations thereof.

In the system 200a, an EDA system 104 generates a request event 202 that includes request content 204. Generally, the request event 202 represents an instance of an EDA event 122 and includes a request that a particular entity perform a particular action, such as publish content to a particular content platform, store data at a particular location, create a data record, update the status of a data record, and so forth. Further, the request content 204 represents parameters and data of the request event 202. The request event 202 is formattable in different ways, such as using the JavaScript Object Notation (JSON) format. A template selector module 206 compares the request event 202 to the mapping data 120 to identify an API template 208 to be utilized for the request event 202. The API template 208, for instance, represents an instance of the templates 118. Generally, the template selector module 206 considers various criteria pertaining to the request event 202 in selecting the API template 208, such as a type of request, an entity that generates the request event 202, an identity of an API to be called, a content type included in the request content 204, and so forth. Accordingly, an applicator module 210 utilizes the API template 208 to extract the request content 204 from the request event 202 and to generate an API call 212 that includes API content 214 based on the request content 204. The API call 212, for instance, represents an instance of the API communications 124. As further detailed below, the API template 208 identifies which request content 204 to extract from the request event 202 and how to arrange the extracted request content 204 in the API call 212 to generate the API content 214.

Further to the system 200a, the mediator module 110 executes the API call 212 on an API 126 of an API system 106. The API system 106, for instance, applies the API content 214 to the API 126 to execute an API action 216 and to generate an API result 218. Examples of different API actions and API results are described throughout this disclosure, such as writing data to a particular storage location, retrieving data from a storage location, updating a data record, and so forth.

Figure 2B:
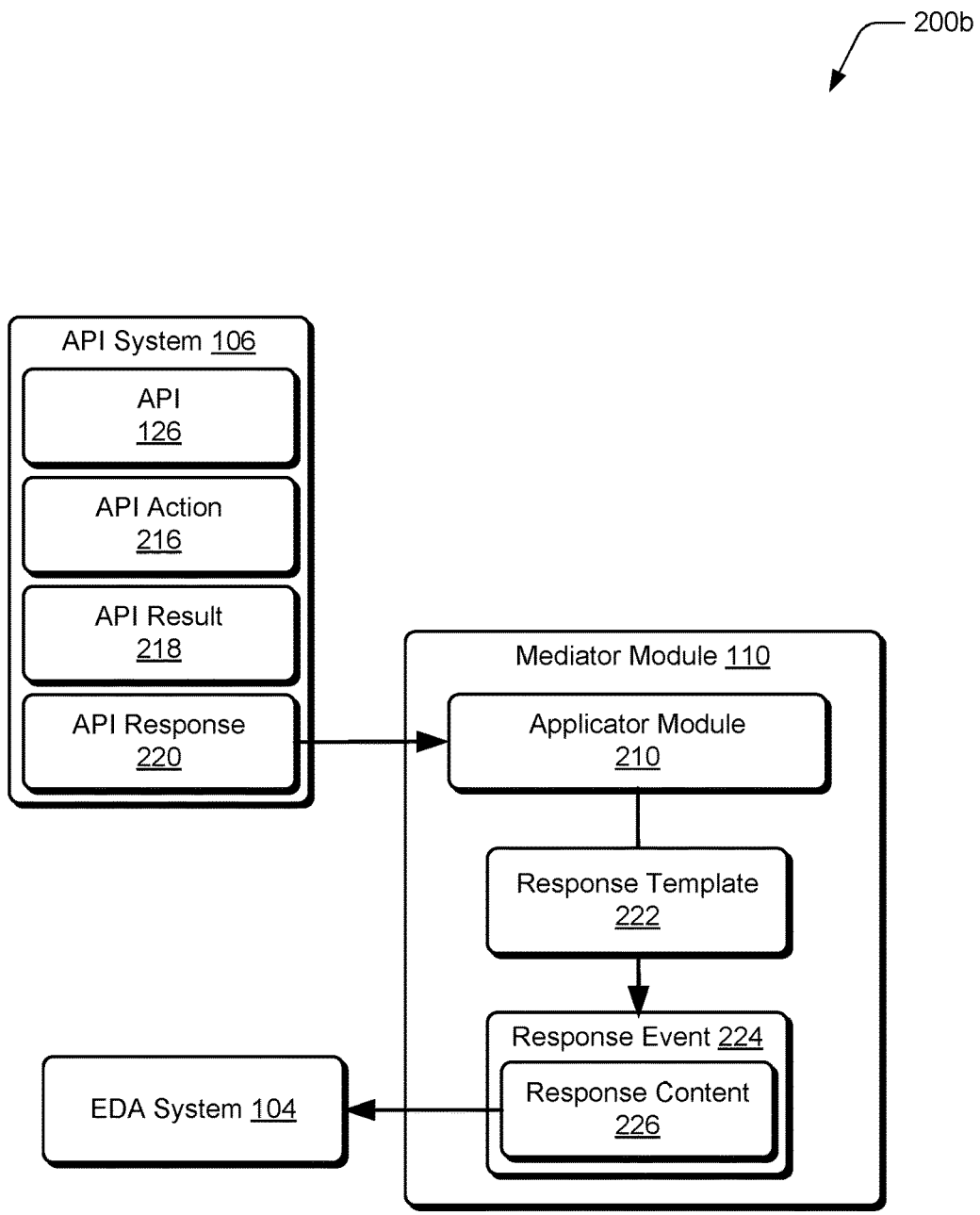
FIG. 2b depicts an example system for notifying an EDA system of the result of execution of an API action.

FIG. 2b depicts an example system 200b for notifying an EDA system 104 of the result of execution of an API action. The system 200b, for example, represents an extension and/or continuation of the system 200a. In the system 200b, the API system 106 executes the API action 216 based on the API call 212 to the API 126 to generate the API result 218, such as discussed above. Based on the API action 216 and the API result 218, the API system 106 generates an API response 220 that describes the API result 218. The API response 220, for instance, represents an instance of the API communications 124 and indicates whether the API result 218 represents a successful API call or an API call failure. In at least one implementation, the API response 220 includes data describing attributes of the API result 218, such as data requested by the API call 212, an identifier for a storage location where data was stored based on the API call 212, and so forth.

Further to the system 200b the API system 106 communicates the API response 220 to the mediator system 102 and the applicator module 210 applies a response template 222 to the API response 220 to generate a response event 224 that includes response content 226. Generally, the response template 222 represents an instance of the templates 118 and is usable to map the API response 220 to an event that is in a format utilized by the EDA system 104. The response event 224, for example, is in a format utilized by the EDA system 104 for communicating and receiving events between different systems. Further, the response content 226 includes data describing the API response 220, such as data generated by the API system 106 and populated to the API response 220. Accordingly, the mediator system 102 communicates the response event 224 to the EDA system 104, which processes the response event 224 to identify the response content 226. Thus, techniques for templates for mapping data events to API calls are implementable to enable communication between systems utilizing disparate communication protocols, such as between EDA-based and API-based systems.

Figure 3:
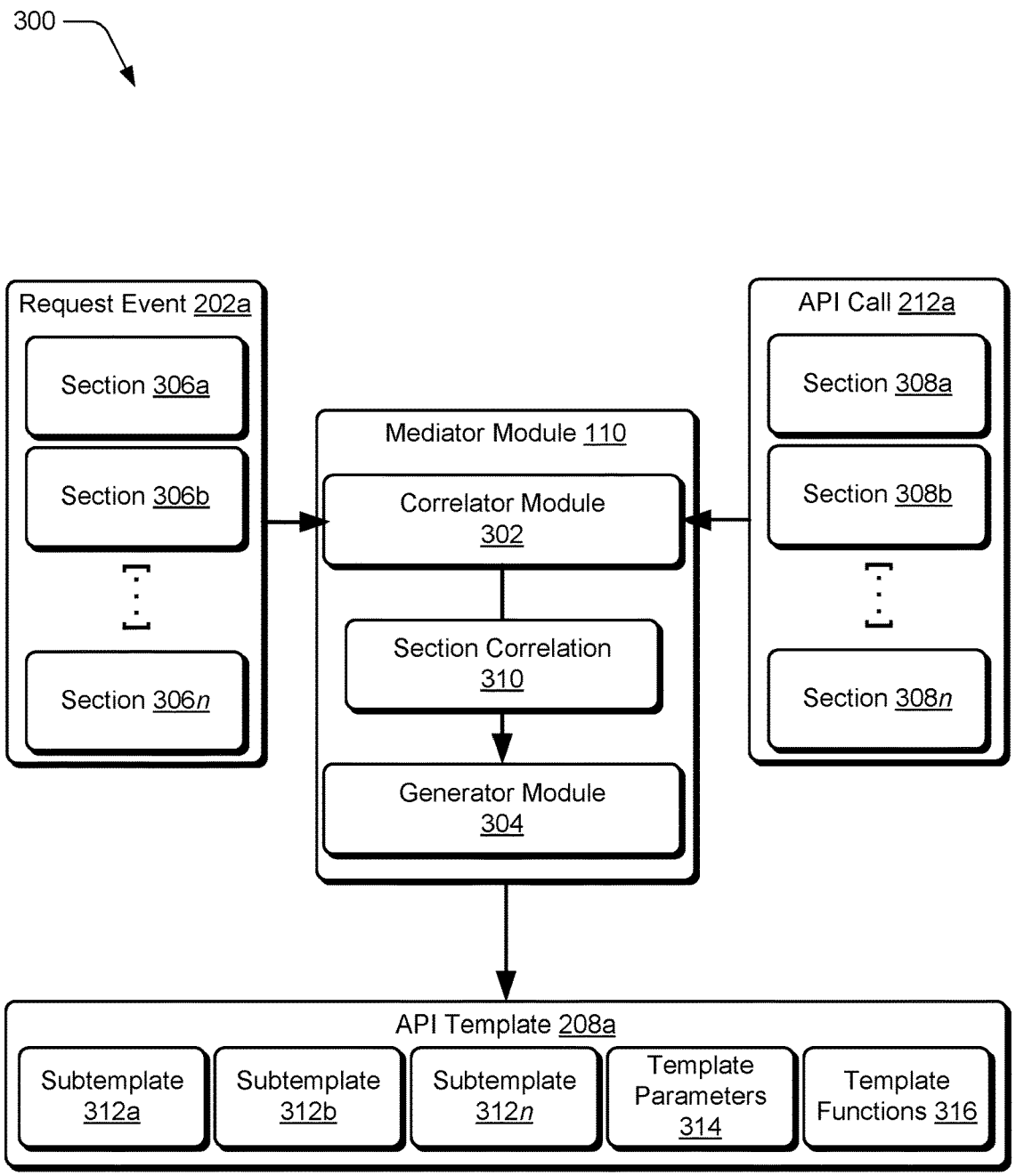
FIG. 3 depicts a system for generating an API template.

FIG. 3 depicts a system 300 for generating an API template. The system 300 includes a correlator module 302 and a generator module 304 which are implementable as functionality of the mediator module 110. The correlator module 302, for example, represents functionality for correlating sections of request events 202 to corresponding sections of API calls 212. In the system 300 the correlator module 302 determines that a section 306a of a request event 202a corresponds to a section 308a of an API call 212a; a section 306b corresponds to a section 308b; and a section 306n corresponds to a section 308n. Generally, correlation of a particular section 306 to a particular section 308 is based on determining that content from a particular section 306 is to be populated to a particular section 308 to generate a properly formatted API call 212, e.g., an API call 212 that is understandable to a target API system 106.

Accordingly, based on correlating the sections 306 to the sections 308, the correlator module 302 generates section correlation 310 data that describes these correlations, and communicates the section correlation 310 to the generator module 304. The generator module 304 utilizes the section correlation 310 to generate an API template 208a. As depicted, the API template 208ca includes a subtemplate 312a, a subtemplate 312b, and a subtemplate 312n. Generally, each subtemplate 312 describes a respective correlation between a section 306 and a respective section 308. For instance, the subtemplate 312a indicates the correlation between the section 306a and the section 308a; the subtemplate 312b indicates the correlation between the section 306b and the section 308b; and the subtemplate 312n indicates a correlation between the section 306n and the section 308n.

In addition to generating the subtemplates 312, the generator module 304 generates template parameters 314 and template functions 316 for the API template 208a. Generally, the template parameters 314 indicate different implementation instructions and constraints for utilizing the API template 208a. Examples of the template parameters 314 include:

(1) Batching—this parameter specifies whether event batching is allowed by a template. Generally, event batching refers to aggregating multiple request events 202 into a single API call 212. For instance, if the batching parameter is set to "true," a template 118 is usable to aggregate multiple request events 202 into a single API call 212. However, if the batching parameter is set to "false," the template 118 is constrained to a single API call 212 per request event 202.

(2) Parallelism—this parameter is utilized to specify a maximum number e of request events 202 permitted to be processed by a template 118 simultaneously and/or concurrently. For instance, if e>1 then multiple request events 202 up to e events are processible individually and concurrently to generate different API calls 212 based on each request event 202. Generally, the parallelism defaults to e=1 which causes an order of request events 202 received and processed using a template 118 to be maintained, e.g., first in/first out. In at least one implementation, the parallelism parameter is usable in conjunction with the batching parameter. For instance, if the batching parameter is set to "true" a number of request events 202 is permitted to be processed using a template 118 up to a max of e and then aggregated into a single API call 212.

(3) Filtering—this parameter enables a template 118 to specify that a particular request event 202 is to be dropped, e.g., not converted into an API call 212. In at least one implementation the filtering parameter specifies a "black hole" location for a request event 202 such as an IP address that specifies a host machine that is not running or an address to which no host has been assigned.

(4) Dead letter—this parameter specifies behaviors to be observed when an API call 212 based on a request event 202 fails, e.g., when an API system 106 that is the target of an API call 212 is not available and/or non-responsive. For instance, the dead letter parameter includes a max retries value that specifies a maximum number of times that an API call 212 is to be retried on a target system. In at least one implementation, the dead letter parameter specifies a network location where failed API calls are to be reported.

The template functions 316 indicate different operations to be executed when applying the API template 208a. Examples of the template functions 316 include:

(1) base64Encode—this function is applicable to generate a base64 encoded string for content. For instance, the function is applicable to encode content from a request event 202 for population to an API call 212.

(2) base64Decode—this function is applicable to decode content (e.g., base64 encoded content) into an encoded object.

(3) Identifier function—this function is applicable to generate an identifier (e.g., a universally unique identifier (UUID)) for an API call 212.

(4) Date function—this function is applicable to generate a current date for an API call, such as in the form of a data string.

(5) Signature function—this function is applicable to generate a signature for inclusion as part of an API call 212, such as an authorization signature generated using credentials an enabling an API call 212 to be authorized by a receiving API system 106.

The various template parameters 314 and template functions 316 are optional and are individually selectable and configurable to provide templates 118 with a diverse array of functionality and applicability. Accordingly, the API template 208a is applicable to convert request events 202 in the format of the request event 202a into API calls 212 of the format of the API call 212a.

Figure 4:
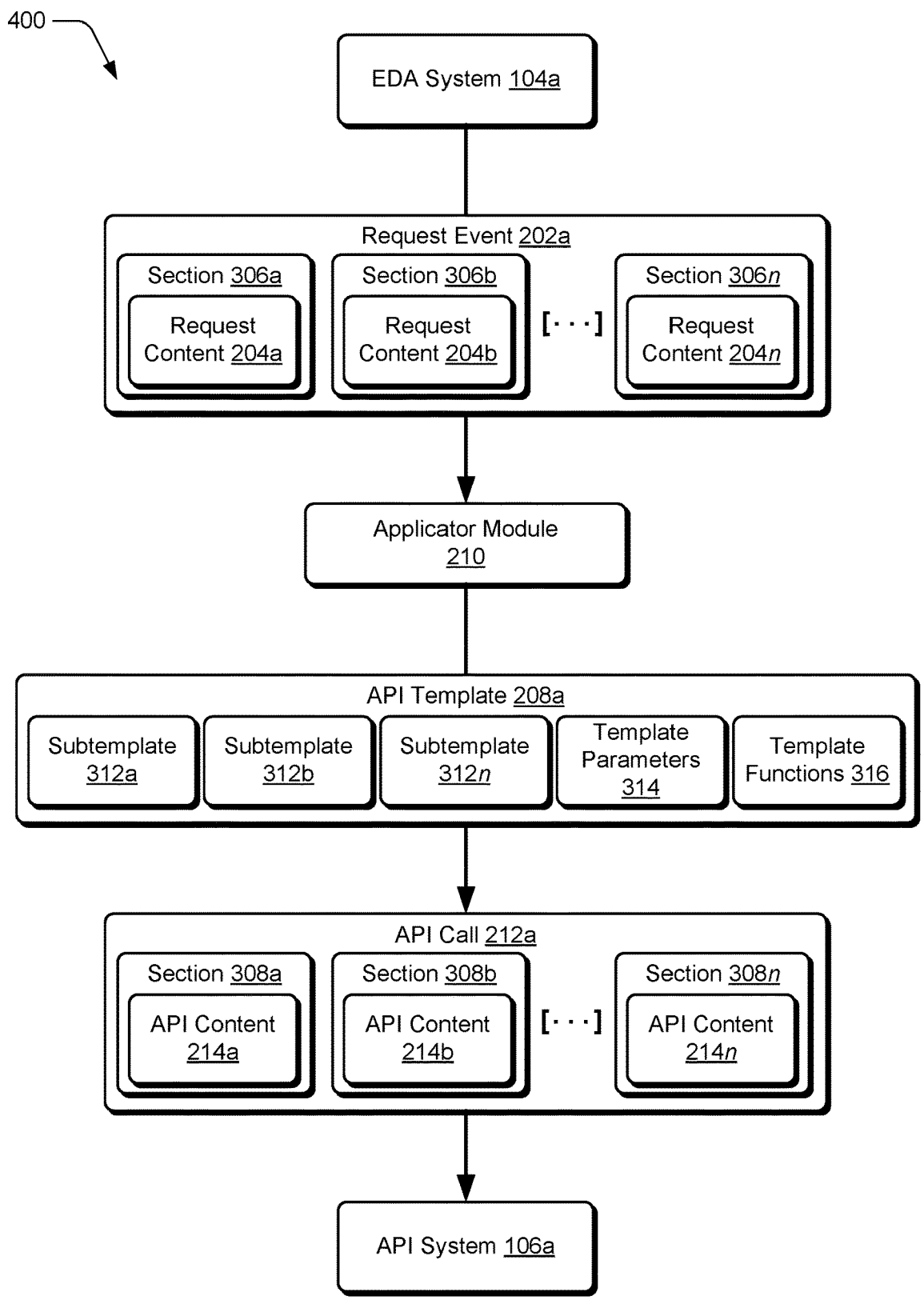
FIG. 4 depicts a scenario for utilizing a template to convert a request event into an API call.

FIG. 4 depicts a scenario 400 for utilizing a template 118 to convert a request event 202 into an API call 212. In the scenario, an EDA system 104a generates a request event 202a with different sections 306, such as described above, and communicates the request event 202a to the mediator system 102. The applicator module 210 determines that the API template 208a is to be applied to the request event 202a, such as based on identification of the API template 208a by the template selector module 206. Accordingly, the applicator module 210 applies the API template 208a to the request event 202a to generate and populate an instance of the API call 212a.

As part of applying the API template 208a to the request event 202a, the applicator module 210 extracts request content 204 from the request event 202a and populates the request content 204 to the API call 212a. For instance, as discussed above the subtemplates 312 specify which sections 306 correlate to which sections 308. Accordingly, the applicator module 210 populates: request content 204a from the section 306a to the section 308a as API content 214a based on the subtemplate 312a; request content 204b from the section 306b to the section 308b as API content 214b based on the subtemplate 312b; and request content 204n from the section 306n to the section 308n as API content 214n based on the subtemplate 312n. In at least one implementation, the applicator module 210 applies the API template 208a to the request event 202a subject to the template parameters 314, such for batching, parallelism, filtering, dead letter handling, and so forth. Further, the applicator module 210 applies a particular instance or instances of the template functions 316 to transform at least some of the request content 204 into API content 214. Accordingly, after generating and populating the API call 212a, the mediator system 102 communicates the API call 212a to an API system 106a. The API system 106a then utilizes the API call 212a to call a particular API 126 and execute an associated API action, such as described with reference to the systems 200a, 200b.

Figure 5:
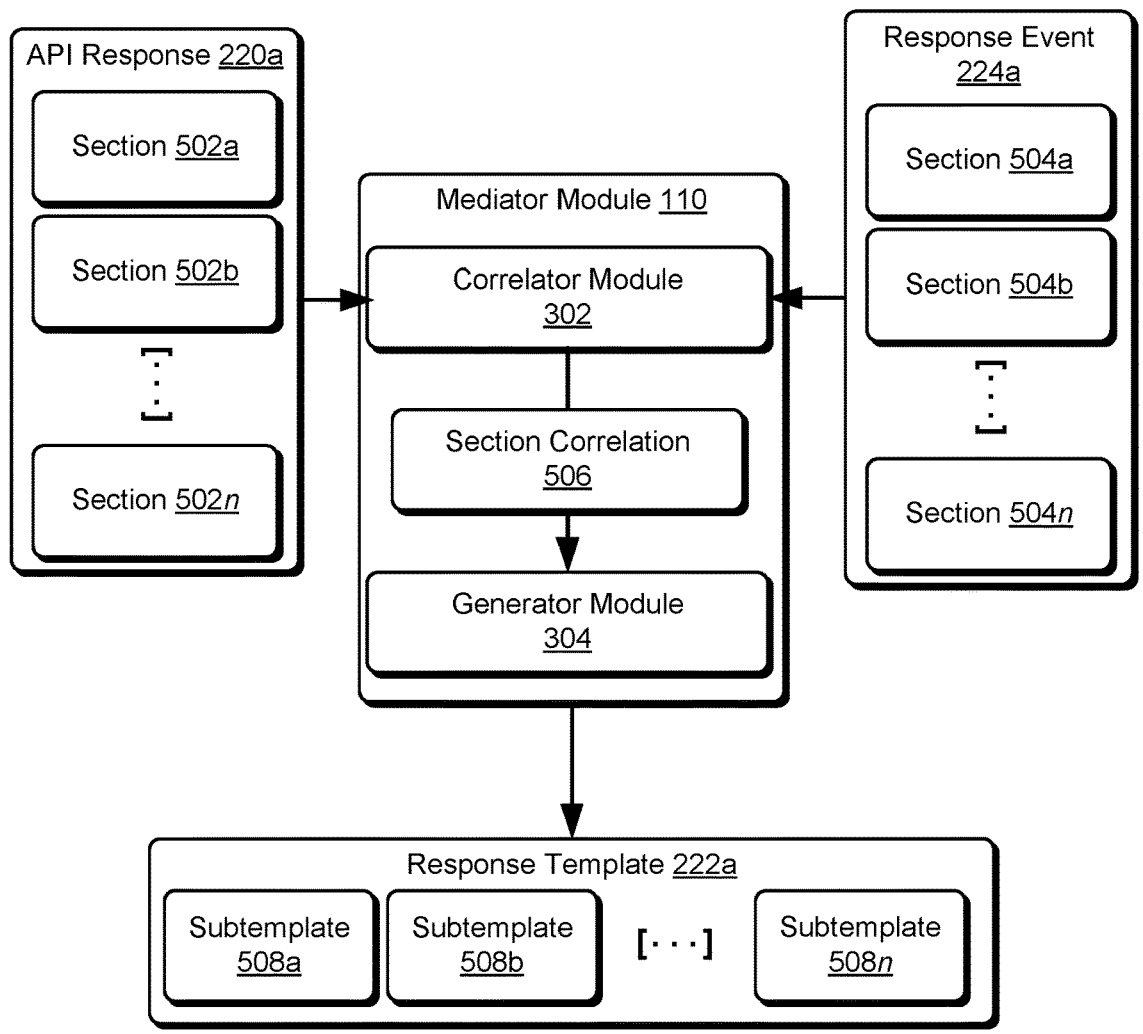
FIG. 5 depicts a system for generating a response template.

FIG. 5 depicts a system 500 for generating a response template. In at least one implementation the system 500 is implemented in conjunction with the systems 200a, 200b for enabling response events 224 based on API calls 212 to be communicated to EDA systems 104. In the system 500, the correlator module 302 correlates sections 502 of an API response 220a to sections 504 of a response event 224a. Generally, correlation of a particular section 502 to a particular section 504 is based on determining that content from a particular section 502 is to be populated to a particular section 504 to generate a properly formatted response event 224, e.g., a response event 224 that is understandable to a target EDA system 104. Accordingly, the correlator module 302 correlates a section 502a of the API response 220a to a section 504a of the response event 224a; a section 502b to an event section 504b; and a section 502n to a section 504n. The correlator module 302 then generates section correlation 506 data that describes these correlations and communicates the section correlation 506 to the generator module 304.

The generator module 304 utilizes the section correlation 506 to generate a response template 222a. As depicted, the response template 222a includes a subtemplate 508a, a subtemplate 508b, and a subtemplate 508n. Generally, each subtemplate 508 describes a respective correlation between a respective section 502 and a respective section 504. For instance: the subtemplate 508a indicates a correlation between the section 502a of the API response 220a and the section 504a of the response event 224a; the subtemplate 508b indicates a correlation between the section 502b and the section 504b; and the subtemplate 508n indicates the correlation between the section 502n and the section 504n. Accordingly, the response template 222a is applicable to convert API responses 220 in the format of the API response 220a into response events 224 of the format of the response event 224a.

Figure 6:
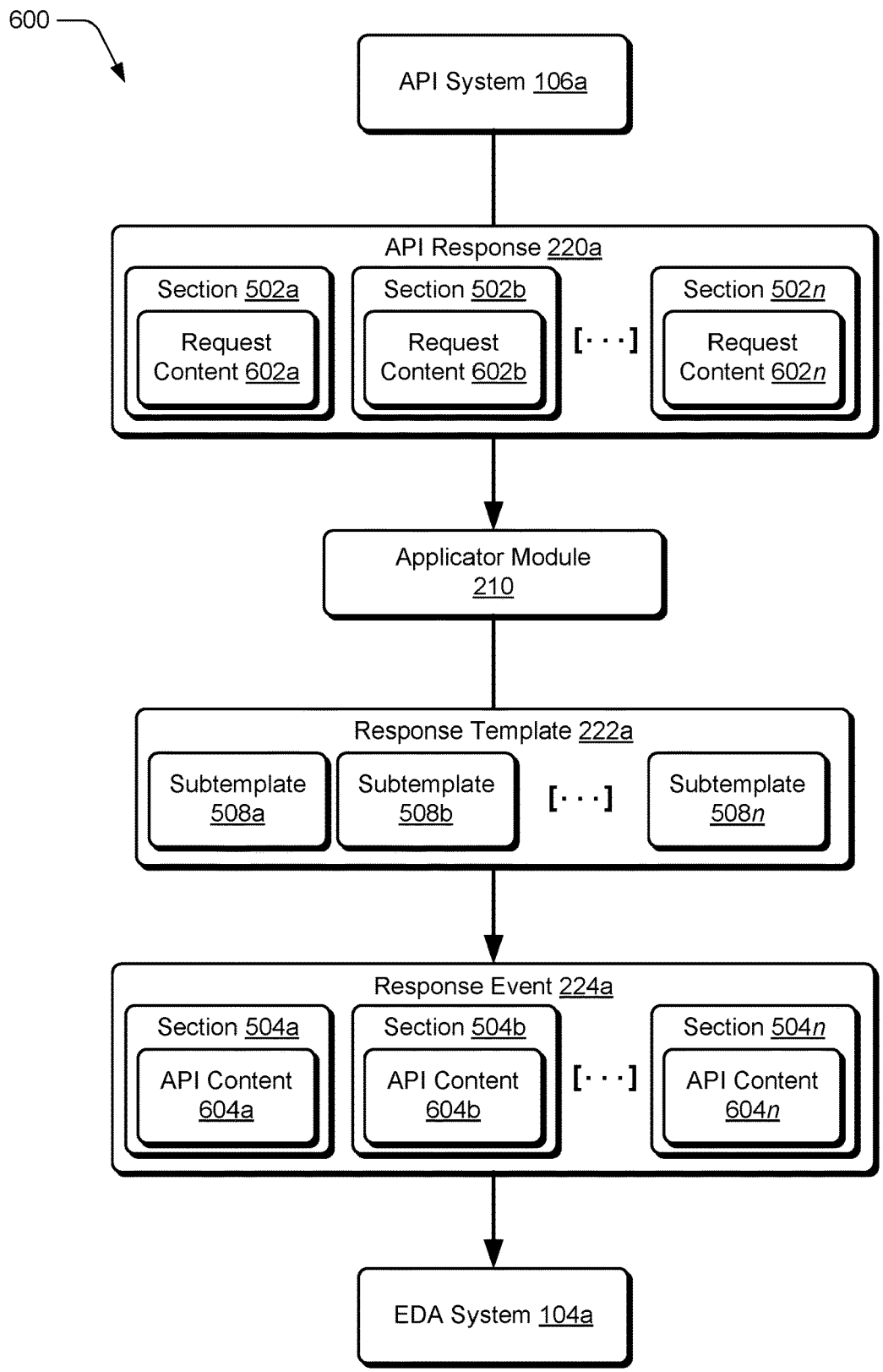
FIG. 6 depicts a system for utilizing a template to convert an API response into a response event.

FIG. 6 depicts a system 600 for utilizing a template to convert an API response 220 into a response event 224. In the system 600, the API system 106a generates an API response 220a with different sections 502, such as described above, and communicates the API response 220a to the mediator system 102. The API response 220a, for instance, is based on an API action 216 executed by the API system 106a in response to an API call 212 generated by the mediator system 102, such as based on a request event 202 from the EDA system 104a. The applicator module 210 determines that the response template 222a is to be applied to the API response 220a, such as based on identification of the response template 222a by the template selector module 206. Accordingly, the applicator module 210 applies the response template 222a to the API response 220a to generate and populate an instance of the response event 224a.

As part of applying the response template 222a to the API response 220a, the applicator module 210 extracts content 602 from the API response 220a and populates the content 602 to the response event 224a. For instance, as discussed above the subtemplates 508 specify which sections 502 of the API response 220a correlate to which sections 504 of the response event 224a. Accordingly, the applicator module 210 populates: content 602a from the section 502a of the API response 220a to the section 504a of the response event 224a as content 604a and based on the subtemplate 508a; content 602b from the section 502b to the section 504b as content 604b and based on the subtemplate 508b; and content 602n from the section 502n to the section 504n as content 604n and based on the subtemplate 508n.

After generating and populating the response event 224a, the mediator system 102 communicates the response event 224a to the EDA system 104a. Generally, the response event 224a notifies the EDA system 104a of the result of an API call 212 requested by the EDA system 104a, such as whether the API call was successful and/or data requested by the API call.

Figure 7:
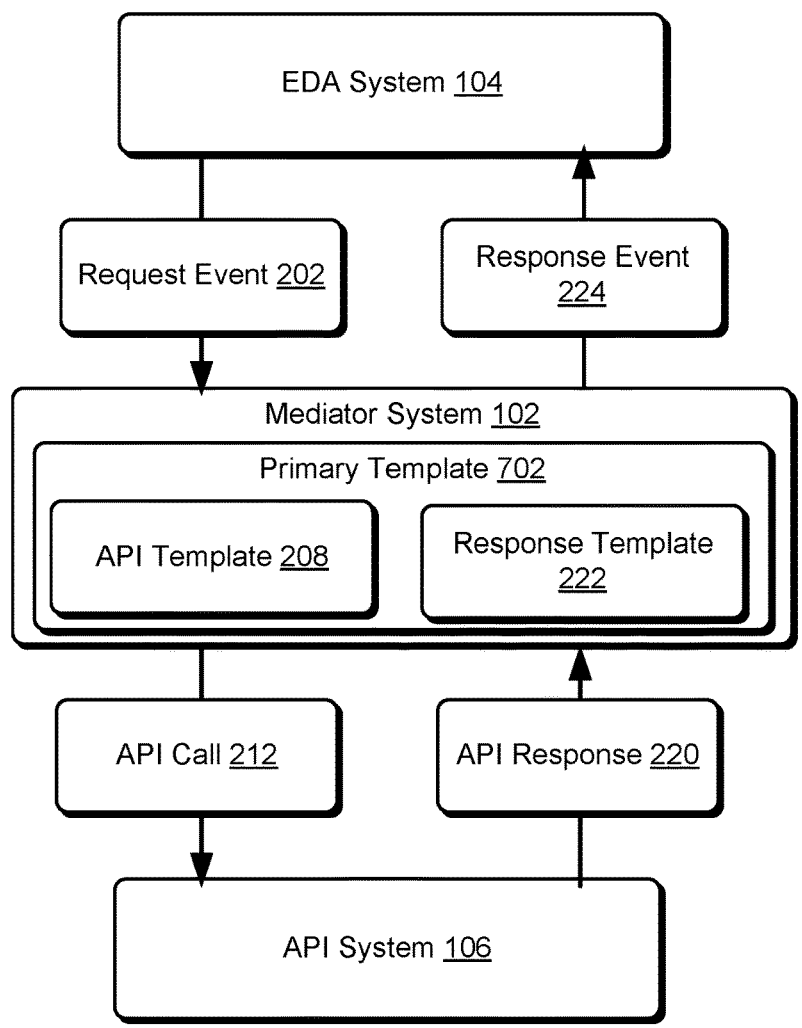
FIG. 7 depicts a system for utilizing an integrated data object for managing an API template and a response template.

FIG. 7 depicts a system 700 for utilizing an integrated data object for managing an API template 208 and a response template 222. The system 700 includes a primary template 702 which in at least one implementation represents an instance of the templates 118. Further the primary template 702 includes an API template 208 and a response template 222. The primary template 702, for example, represents an integrated (e.g., single) data object that includes the API template 208 and the response template 222. Generally, utilizing the primary template 702 enables the API template 208 and the response template 222 to be utilized as part of round trip communication between an EDA system 104 and an API system 106.

For instance, an EDA system 104 generates and communicates a request event 202 to the mediator system 102, and the mediator system 102 utilizes an API template 208 to generate an API call 212 and communicates the API call 212 to an API system 106. The API system 106 executes the API call 212, generates an API response 220 indicating a result of executing the API call 212, and communicates the API response 220 to the mediator system 102. The mediator system 102 determines that the API response 220 is associated with the primary template 702 such as based on a token or other identifier for the primary template 702. Accordingly, the mediator system 102 utilizes the response template 222 to generate a response event 224 and communicates the response event 224 to the EDA system 104. Thus, the primary template 702 represents an example way for enabling back-and-forth communication between the EDA system 104 and the API system 106 as part of a set of related data transactions.

Figure 8A:
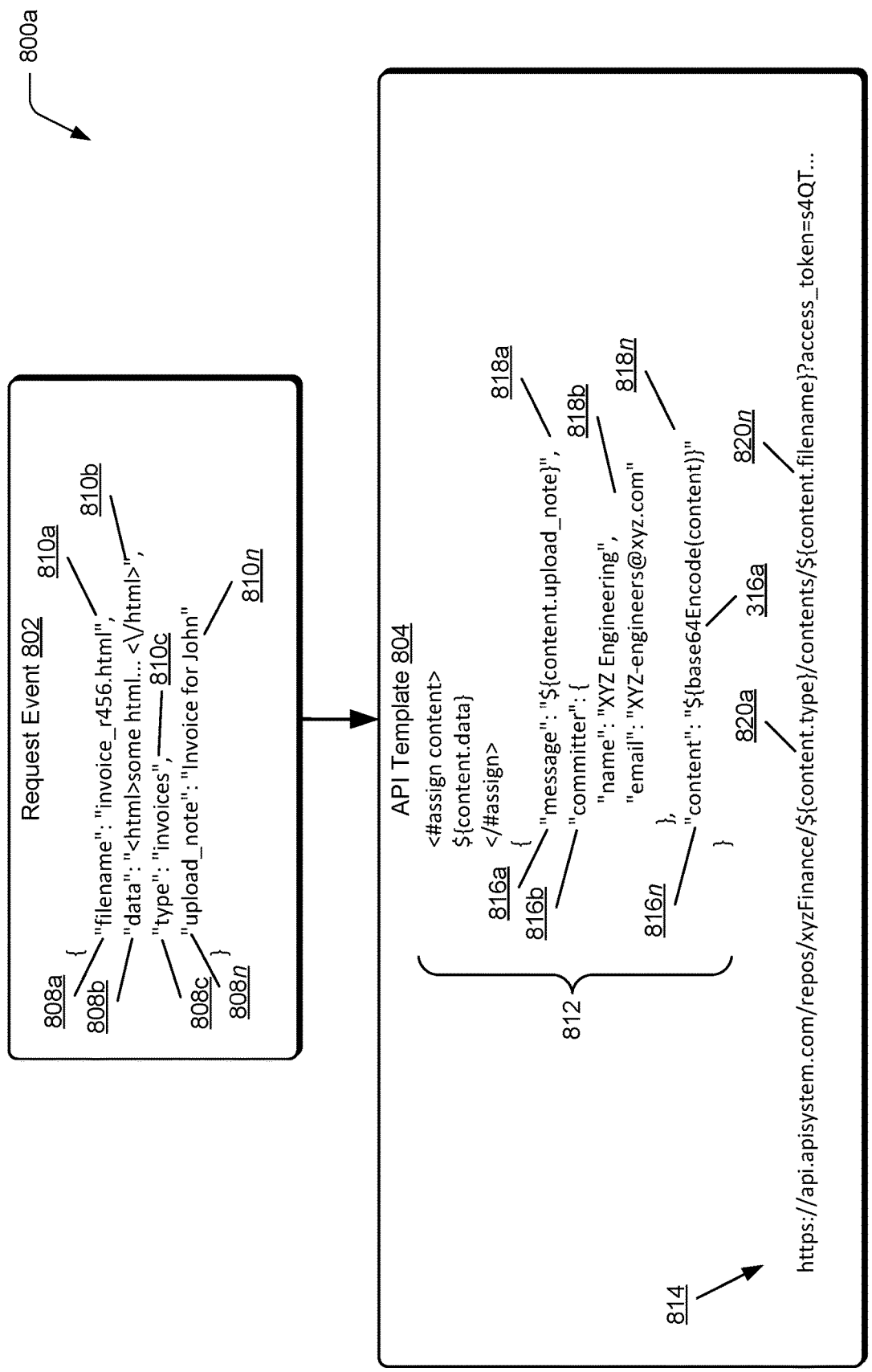
FIG. 8a depicts an example scenario for utilizing a template to map an event to an API call.

FIG. 8a depicts an example scenario 800a for utilizing a template to map an event to an API call. The scenario 800a includes a request event 802 and an API template 804. For example, the request event 802 represents an instance of an EDA event 122 and the API template 804 represents an instance of the templates 118. The request event 802 includes various sections 808 each populated with content 810.

The API template 804 includes a body template 812 and a URL template 814 for use in transforming the request event 802 into an API call. The body template 812 includes different subtemplates 816 that specify content 818 to include as part of a body of an API call. Further, the URL template 814 includes different subtemplates 820 that point to content to include as part of a URL for an API call.

Figure 8B:
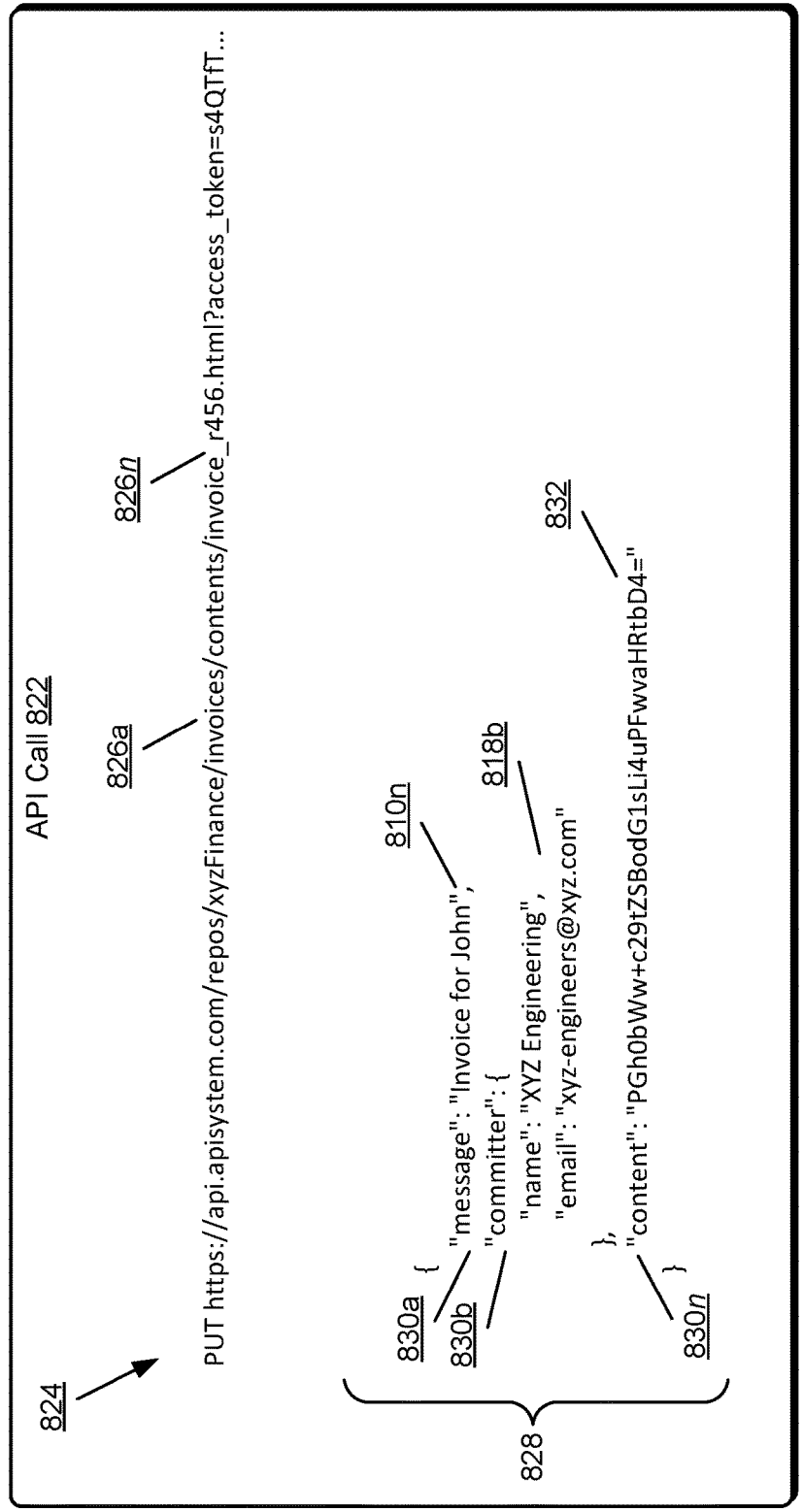
FIG. 8b depicts an example scenario for utilizing a template to map an event to an API call.

FIG. 8b depicts an example scenario 800b for utilizing a template to map an event to an API call. The scenario 800b, for example, represents a continuation of the scenario 800a and depicts application of the API template 804 to the request event 802 to generate an API call 822. In the scenario 800b the API call 822 includes a URL 824 with sections 826 and a call body 828 with sections 830. Generally, the URL 824 is addressed to a location for a target API and is used to route the API call 822 to the appropriate location. Further, to generate the URL 824, the subtemplate 820a of the URL template 814 specifies that content from the section 808c of the request event 802 is to be populated to the section 826a. Further, the subtemplate 820n specifies that content from the section 808a is to be populated to the section 826n. Accordingly, the applicator module 210 applies the URL template 814 to populate the content 810c to the section 826a of the URL 824 and the content 810a to the section 826n, as illustrated in the URL 824.

To populate the call body 828, the subtemplate 816a of the body template 812 specifies that content from the section 808n is to be populated to the section 830a; the subtemplate 816b includes content to be populated to the section 830b; and the subtemplate 816n specifies that content from the section 808b is to be populated to the section 830n. Further, the subtemplate 816n specifies a template function 316a to be applied to content before being populated to the section 830n. In this particular example the template function 316a specifies that content is to be base64 encoded before being populated to the section 830n. Accordingly, the applicator module 210 applies the body template 812 by populating the content 810n to the section 830 and content 818b to the section 830b. The content 818b, for instance, represents additional content not included in the request event 802 that is to be included in the API call 822. Further, the applicator module 210 base64 encodes content 810b from the section 808b of the request event 802 and populates the encoded content as content 832 to the section 830n.

Accordingly, the API call 822 is formatted with content from the request event 802 and based on the API template 804 and is usable to invoke an API of an API system 106. In this particular example the API call 822 is formatted to invoke an API to perform a "PUT" method, but it is to be appreciated that techniques described herein are performable to invoke a variety of different APIs to perform a variety of different actions in accordance with one or more implementations.

Figure 9:
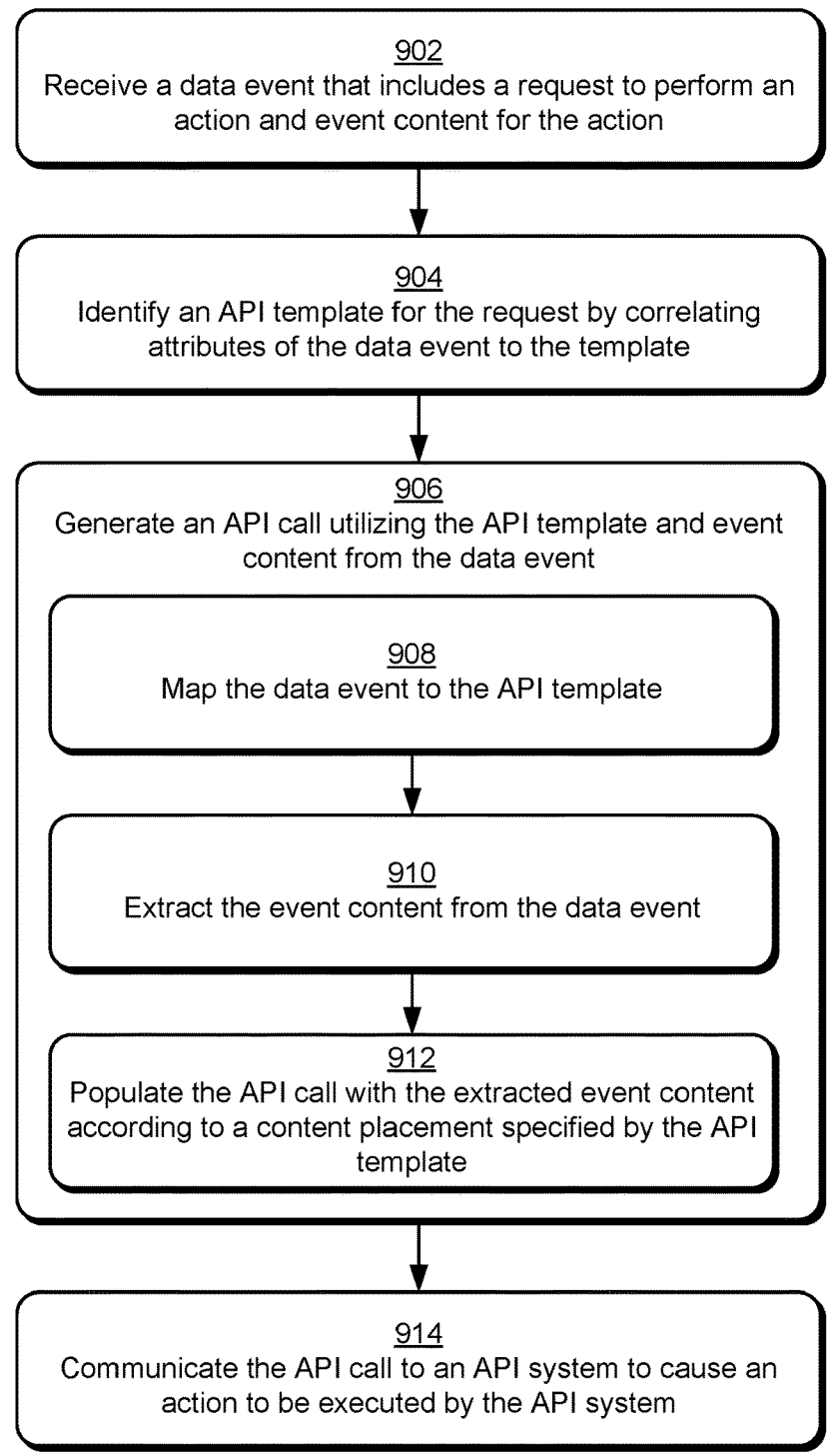
FIG. 9 depicts an example method for templates for mapping data events to API calls.

FIG. 9 depicts an example method 900 for templates for mapping data events to API calls. The method, for instance, is performed by the mediator system 102 utilizing the mediator module 110. Step 902 receives a data event that includes a request to perform an action and event content for the action. The mediator system 102, for instance, receives a request event from an EDA system 104 that includes a request to perform a particular computational task, such as writing data to a storage location, retrieving data to a storage location, updating a data record, publishing digital content, and so forth. Further, the request event includes content to be used for performing the computational task.

Step 904 identifies an API template for the request by correlating one or more attributes of the data event to the template from a set of templates. For instance, the template selector module 206 selects an API template 208 from the templates 118 and based on attributes of a request event 202, such as a type of request, an API to be utilized to perform an action based on the request, and so forth. Step 906 generates an API call utilizing the API template and event content from the data event. The applicator module 210, for example, generates the API call utilizing content from the data event. In at least one implementation generating the API call includes:

Step 908 maps the data event to the API template. For instance, the applicator module 210 identifies subtemplates from the API template and determines, based on the subtemplates, which sections of the data event are mapped to which subtemplates. Step 910 extracts the event content from the data event. The applicator module 210, for example, extracts event content from various sections of the data event. Step 912 populates the API call with the extracted event content according to a content placement specified by the API template. For instance, the applicator module 210 utilizes the subtemplates to determine which content extracted from the data event is to be placed at which portions of the API call and populates the API call with the extracted content accordingly.

Step 914 communicates the API call to an API system to cause an action to be executed by the API system based on the request from the data event. The mediator module 110, for instance, communicates the populated API call 212 to an API system 106 identified by the API call. The API system 106 utilizes the API call to perform an action identified by the API call, examples of which are described throughout.

Figure 10:
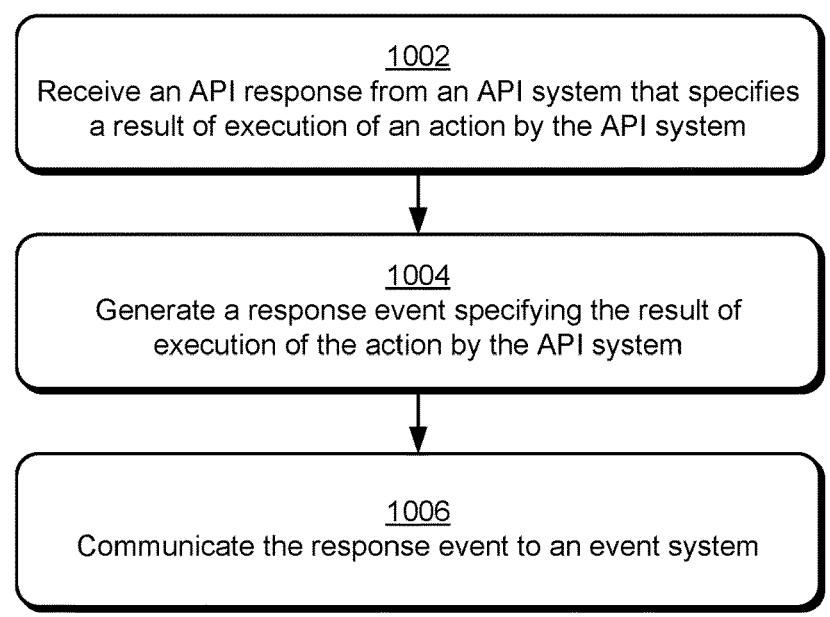
FIG. 10 depicts an example method for generating a response event.

FIG. 10 depicts an example method 1000 for generating a response event. The method, for instance, is performed by the mediator system 102 utilizing the mediator module 110 and represents an extension and/or continuation of the method 900. Step 1002 receives an API response from an API system that specifies a result of execution of an action by the API system. The mediator system 102, for instance, receives a data communication from an API system 106 that indicates a result of attempting to perform an action requested by a previous API call received from the mediator system 102.

Step 1004 generates a response event by mapping the API response to a response template to populate the response event with API content specifying the result of execution of the action by the API system. The template selector module 206, for instance, identifies a response template 222 that correlates to the API response, such as based on an identity of an API system and/or API call associated with the API response. Alternatively or additionally, the API response is correlated to a data object used to generate the original API call upon which the API response is based, e.g., the primary template 702. Accordingly, subtemplates of the response template are utilized to map and populate content from the API response to the response event.

Step 1006 communicates the response event to an event system. The mediator system 102, for example, communicates the response event 224 to an EDA system 104 that generated a data event upon which the response event is based. The EDA system 104, for instance, generated a data event that was transformed into an API call upon which the response event is based.

Figure 11:
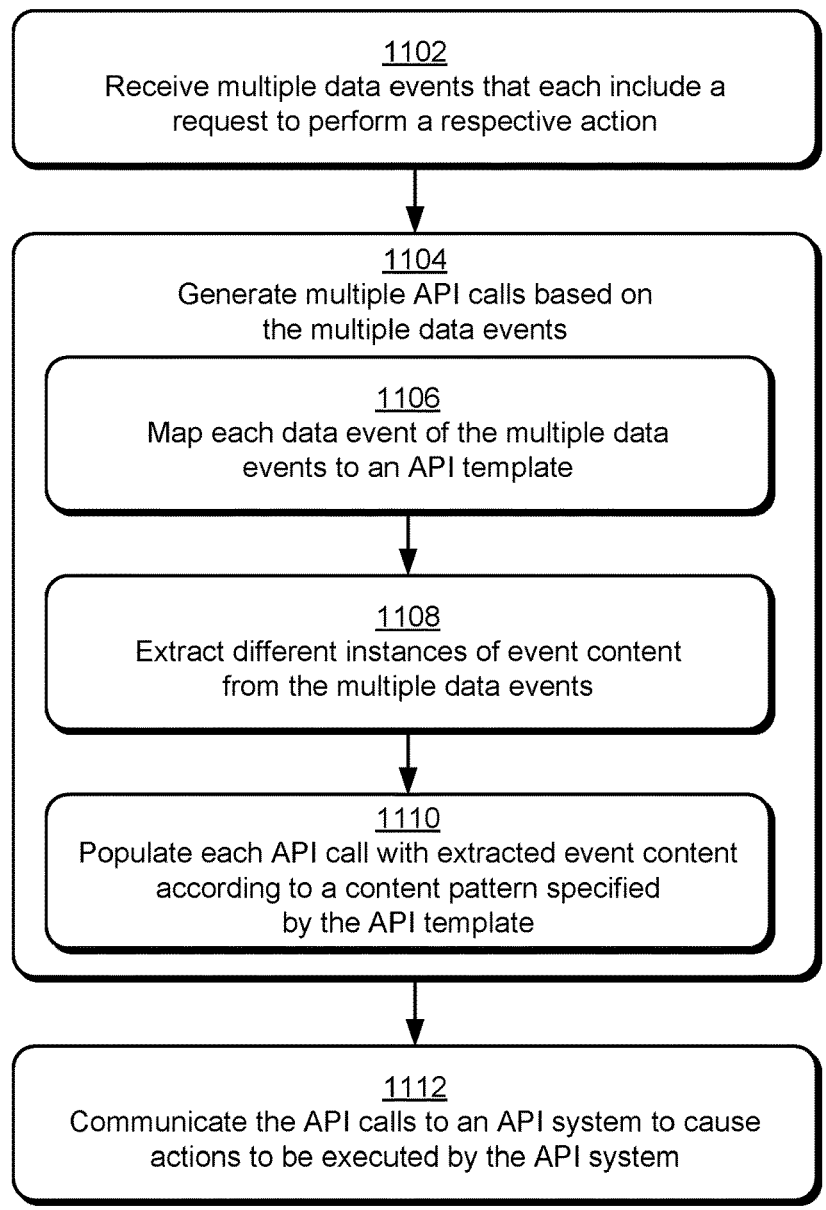
FIG. 11 depicts an example method for generating multiple API calls based on multiple data events.

FIG. 11 depicts an example method 1100 for generating multiple API calls based on multiple data events. The method, for instance, is performed by the mediator system 102 utilizing the mediator module 110 and is performed in conjunction with the method 900. Step 1102 receives multiple data events that each include a request to perform a respective action. The mediator system 102, for instance, receives multiple data events from an EDA system 104 and/or multiple EDA systems 104 that each include a request to perform a particular computational action. In at least one implementation, the data events include requests to perform a common (e.g., same) action and include different content to be utilized for performing the action.

Step 1104 generates multiple API calls based on the multiple data events. The template selector module 206, for example, identifies an API template for the data events and the applicator module 210 applies the API template to the data events to generate a separate API call for each data event. In at least one implementation generating the multiple API calls includes: Step 1106 maps each data event of the multiple data events to an API template. For instance, the applicator module 210 identifies subtemplates from the API template and determines, based on the subtemplates, which sections of the data events are mapped to which subtemplates.

Step 1108 extracts different instances of event content from the multiple data events. The applicator module 210, for example, extracts event content from various sections of the data events. Step 1110 populates each API call of the multiple API calls with a respective instance of extracted event content according to a content pattern specified by the API template. For instance, the applicator module 210 utilizes the subtemplates to determine which content extracted from the data events is to be placed at which portions of the API calls and populates the API calls with the extracted content accordingly. In at least one implementation, the API calls represent calls to a common (e.g., same) API and/or calls to different APIs.

Step 1112 communicates the multiple API calls to an API system to cause multiple actions to be executed by the API system based on different respective requests from the multiple data events. The mediator module 110, for example, communicates the multiple API calls to an API system 106. Alternatively or additionally, at least some of the API calls are communicated to different API systems 106. In at least some implementations, multiple API responses are received from the API system(s) based on executing the API calls and the API responses are transformed into response events that are each communicated to a respective EDA system 104. Example ways for generating response events based on API responses are detailed above.

Figure 12:
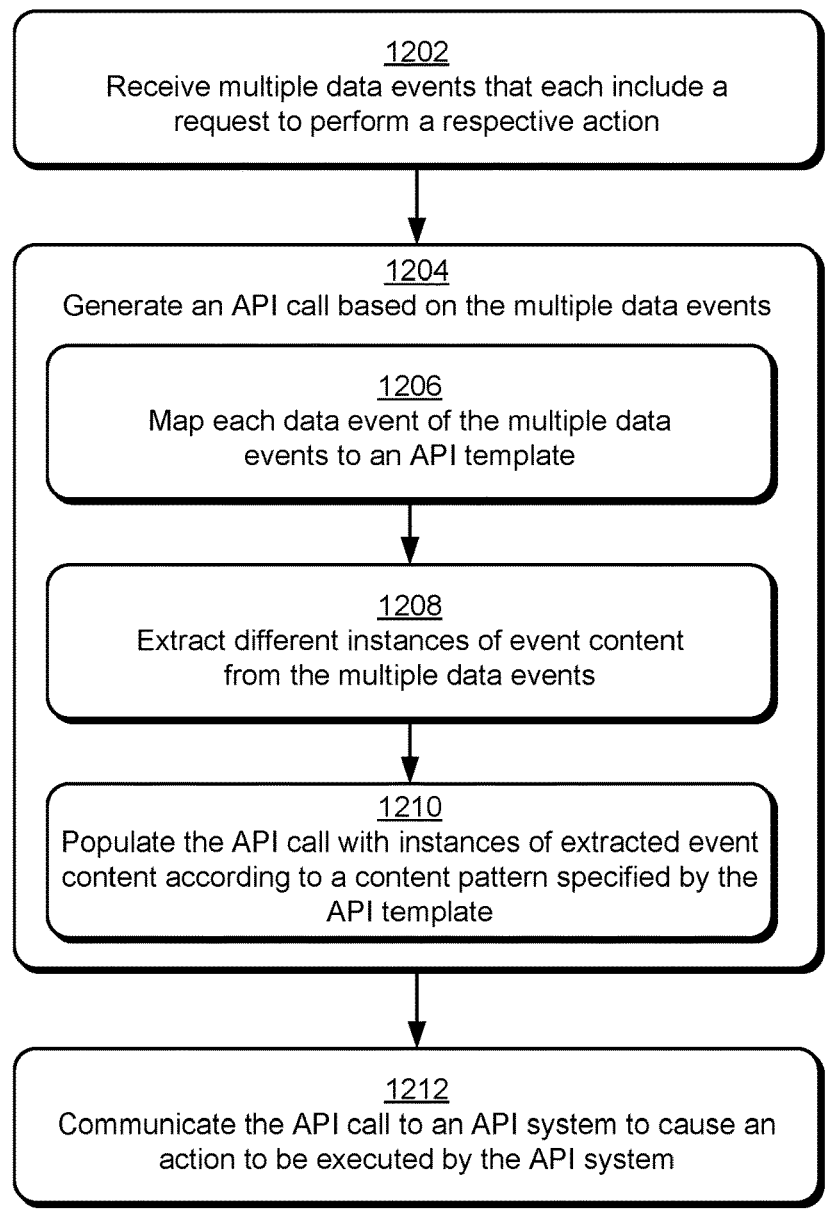
FIG. 12 depicts an example method for generating a single API call based on multiple data events.

FIG. 12 depicts an example method 1200 for generating a single API call based on multiple data events. The method, for instance, is performed by the mediator system 102 utilizing the mediator module 110 and is performed in conjunction with the method 900. Step 1202 receives multiple data events that each include a request to perform a respective action. The mediator system 102, for instance, receives multiple data events from an EDA system 104 and/or multiple EDA systems 104 that each include a request to perform a particular computational action. In at least one implementation, the data events include requests to perform a common (e.g., same) action and include different content to be utilized for performing the action.

Step 1204 generates an API call based on the multiple data events. The template selector module 206, for example, identifies an API template for the data events and the applicator module 210 applies the API template to the data events to generate a single API call for the data events. In at least one implementation generating the API call includes: Step 1206 maps each data event of the multiple data events to the API template. For instance, the applicator module 210 identifies subtemplates from the API template and determines, based on the subtemplates, which sections of the data events are mapped to which subtemplates.

Step 1208 extracts different instances of event content from the multiple data events. The applicator module 210, for example, extracts event content from various sections of the data events. Step 1210 populates the API call with instances of extracted event content according to a content pattern specified by the API template. For instance, the applicator module 210 utilizes the subtemplates to determine which content extracted from the data events is to be placed at which portions of the API call and populates the API call with the extracted content accordingly.

Step 1212 communicates the API call to an API system to an action to be executed by the API system and utilizing content from the multiple data events. The mediator module 110, for example, communicates the multiple API call to an API system 106. In at least some implementations, a single API response and/or multiple API responses are received from the API system(s) based on executing the API call and the API response is transformed into a response event that is communicated to a respective EDA system 104. Example ways for generating a response event based on an API response are detailed above.

Figure 13:
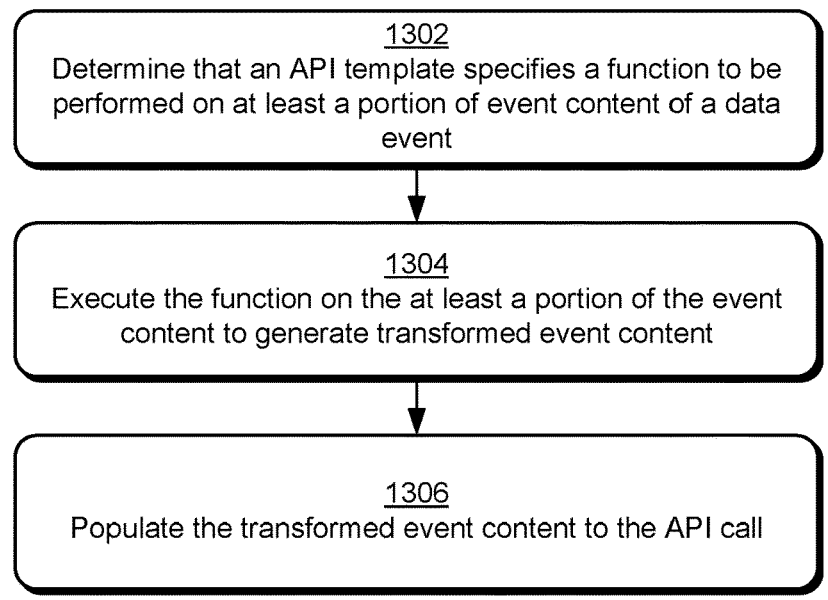
FIG. 13 depicts an example method for transforming event content from a data event for an API call.

FIG. 13 depicts an example method 1300 for transforming event content from a data event for an API call. The method, for instance, is performed by the mediator system 102 utilizing the mediator module 110 and is performed in conjunction with the method 900. Step 1302 determines that an API template specifies a function to be performed on at least a portion of event content of a data event. For instance, as part of generating an API call based on an EDA event 122, the applicator module 210 determines that an API template 208 specifies a function (e.g., an algorithm) to be applied to transform content from the EDA event 122. Examples of different functions are described above with reference to the template functions 316.

Step 1304 executes the function on the at least a portion of the event content to generate transformed event content. The applicator module 210, for instance, executes the function on the event content to generate transformed event content. Step 1306 populates the transformed event content to the API call. For example, the applicator module 210 populates the transformed event content to a section of the API call identified by the API template, such as based on a subtemplate of the API template. The API call is then utilized to call an API to perform a particular action, such as described above.

The example methods described above are performable in various ways, such as for implementing different aspects of the systems and scenarios described herein. For instance, aspects of the methods are implemented by the mediator module 110. Generally, any services, components, modules, methods, and/or operations described herein are able to be implemented using software, firmware, hardware (e.g., fixed logic circuitry), manual processing, or any combination thereof. Some operations of the described methods, for example, are described in the general context of executable instructions stored on computer-readable storage memory that is local and/or remote to a computer processing system, and implementations include software applications, programs, functions, and the like. Alternatively or in addition, any of the functionality described herein is performable, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like. The order in which the methods are described is not intended to be construed as a limitation, and any number or combination of the described method operations are able to be performed in any order to perform a method, or an alternate method.

Accordingly, the described techniques provide automated processes for antialiasing visual objects. Having described example procedures in accordance with one or more implementations, consider now an example system and device that are able to be utilized to implement the various techniques described herein.

Example System and Device

Figure 14:
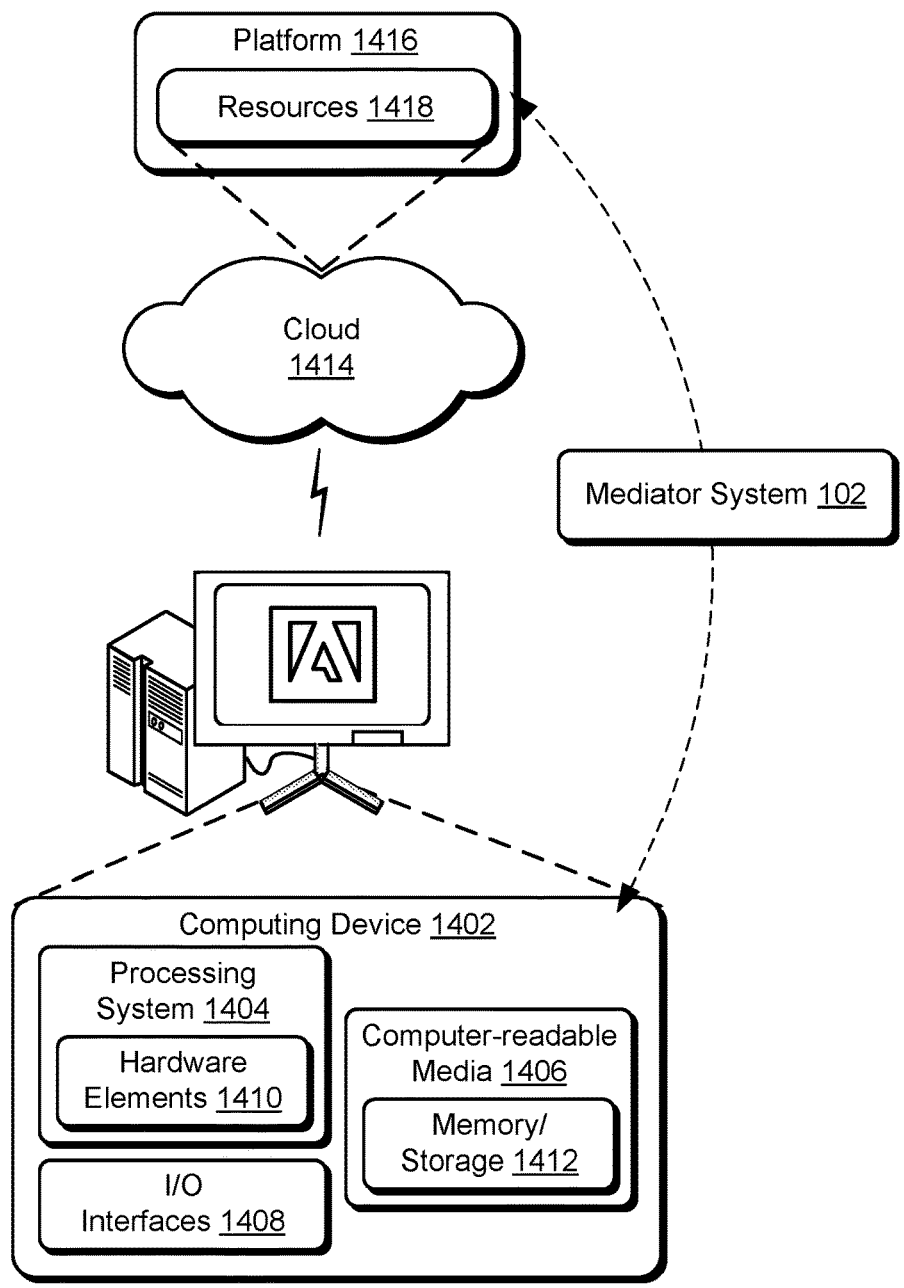
FIG. 14 illustrates an example system including various components of an example device that are implementable as any type of computing device as described and/or utilized with reference to FIGS. 1-13 to implement aspects of the techniques described herein.

FIG. 14 illustrates an example system 1400 that includes an example computing device 1402 that is representative of one or more computing systems and/or devices that are usable to implement the various techniques described herein. This is illustrated through inclusion of the mediator system 102. The computing device 1402 includes, for example, a server of a service provider, a device associated with a client (e.g., a client device), an on-chip system, and/or any other suitable computing device or computing system.

The example computing device 1402 as illustrated includes a processing system 1404, one or more computer-readable media 1406, and one or more I/O interfaces 1408 that are communicatively coupled, one to another. Although not shown, the computing device 1402 further includes a system bus or other data and command transfer system that couples the various components, one to another. For example, a system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1404 is representative of functionality to perform one or more operations using hardware. Accordingly, the processing system 1404 is illustrated as including hardware elements 1410 that are be configured as processors, functional blocks, and so forth. This includes example implementations in hardware as an application specific integrated circuit or other logic device formed using one or more semiconductors. The hardware elements 1410 are not limited by the materials from which they are formed or the processing mechanisms employed therein. For example, processors are comprised of semiconductor(s) and/or transistors (e.g., electronic integrated circuits (ICs)).

In such a context, processor-executable instructions are, for example, electronically-executable instructions.

The computer-readable media 1406 is illustrated as including memory/storage 1412. The memory/storage 1412 represents memory/storage capacity associated with one or more computer-readable media. In one example, the memory/storage component 1412 includes volatile media (such as random access memory (RANI)) and/or nonvolatile media (such as read only memory (ROM), Flash memory, optical disks, magnetic disks, and so forth). In another example, the memory/storage component 1412 includes fixed media (e.g., RAM, ROM, a fixed hard drive, and so on) as well as removable media (e.g., Flash memory, a removable hard drive, an optical disc, and so forth). The computer-readable media 1406 is configurable in a variety of other ways as further described below.

Input/output interface(s) 1408 are representative of functionality to allow a user to enter commands and information to computing device 1402, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1402 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implementable on a variety of commercial computing platforms having a variety of processors.

Implementations of the described modules and techniques are storable on or transmitted across some form of computer-readable media. For example, the computer-readable media includes a variety of media that that is accessible to the computing device 1402. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable, and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which are accessible to a computer.

"Computer-readable signal media" refers to a signal-bearing medium that is configured to transmit instructions to the hardware of the computing device 1402, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1410 and computer-readable media 1406 are representative of modules, programmable device logic and/or fixed device logic implemented in a hardware form that is employable in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also employable to implement various techniques described herein. Accordingly, software, hardware, or executable modules are implementable as one or more instructions and/or logic embodied on some form of computer-readable storage media and/or by one or more hardware elements 1410. For example, the computing device 1402 is configured to implement particular instructions and/or functions corresponding to the software and/or hardware modules. Accordingly, implementation of a module that is executable by the computing device 1402 as software is achieved at least partially in hardware, e.g., through use of computer-readable storage media and/or hardware elements 1410 of the processing system 1404. The instructions and/or functions are executable/operable by one or more articles of manufacture (for example, one or more computing devices 1402 and/or processing systems 1404) to implement techniques, modules, and examples described herein.

The techniques described herein are supportable by various configurations of the computing device 1402 and are not limited to the specific examples of the techniques described herein. This functionality is also implementable entirely or partially through use of a distributed system, such as over a "cloud" 1414 as described below.

The cloud 1414 includes and/or is representative of a platform 1416 for resources 1418. The platform 1416 abstracts underlying functionality of hardware (e.g., servers) and software resources of the cloud 1414. For example, the resources 1418 include applications and/or data that are utilized while computer processing is executed on servers that are remote from the computing device 1402. In some examples, the resources 1418 also include services provided over the Internet and/or through a subscriber network, such as a cellular or Wi-Fi network.

The platform 1416 abstracts the resources 1418 and functions to connect the computing device 1402 with other computing devices. In some examples, the platform 1416 also serves to abstract scaling of resources to provide a corresponding level of scale to encountered demand for the resources that are implemented via the platform. Accordingly, in an interconnected device embodiment, implementation of functionality described herein is distributable throughout the system 1400. For example, the functionality is implementable in part on the computing device 1402 as well as via the platform 1416 that abstracts the functionality of the cloud 1414.

CONCLUSION

Although implementations have been described in language specific to structural features and/or methodological acts, it is to be understood that the implementations defined in the appended claims is not necessarily limited to the specific features or acts described. Rather, the specific features and acts are disclosed as example forms of implementing the claimed implementations.

What is claimed is:

1. A method comprising:
receiving, by at least one processing device, a data event that includes a request to perform an action by an application programming interface (API) system and event content for the action including parameters for the data event;
identifying, by the at least one processing device, an API template for the request by comparing one or more attributes of the data event to one or more attributes of the API template from a set of API templates, the one of more attributes of the data event including the parameters for the data event that include a type of a request, an entity that generated the request, and a content type;
generating, by the at least one processing device, an API call by mapping the data event to the API template, extracting the event content from the data event, and populating the API call with the extracted event content by arranging the extracted event content according to a content pattern specified by the API template;
communicating, by the at least one processing device, the API call to the API system to cause an action to be executed by the API system based on the request from the data event;
receiving, by the at least one processing device, an API response from the API system that specifies a result of execution of the action by the API system and an indication of a successful API call or an API call failure;
generating, by the at least one processing device, a response event by mapping the API response to a response template associated with the API template to populate the response event with API content specifying the result of execution of the action by the API system based on the indication; and
communicating, by the at least one processing device, the response event to an event system from which the data event was received.

2. A method as described in claim 1, wherein the set of API templates includes multiple different API templates for multiple different APIs, and wherein said identifying the API template is based at least in part on an identity of an API to be called by the API call.

3. A method as described in claim 1, wherein the API template specifies which portions of the extracted event content are to be populated to the API call according to the content pattern.

4. A method as described in claim 1, wherein the API template includes multiple subtemplates that each correspond to a different section of the API call and specify which event content from the data event is to be populated to a respective section of the API call, and wherein said generating the API call is based on applying the subtemplates to the event content.

5. A method as described in claim 1, wherein the API template specifies a function to be performed on at least a portion of the event content, and wherein said generating the API call comprises executing the function on the at least a portion of the event content to generate transformed event content and populating the transformed event content to the API call.

6. A method as described in claim 1, wherein the API template specifies additional content not included in the data event that is to be included in the API call, and wherein said generating the API call comprises populating the additional content to the API call.

7. A method as described in claim 1, wherein said receiving further comprises receiving multiple data events including the data event that each include a request to perform a respective action, and wherein the method further comprises:
generating, by the at least one processing device, multiple API calls by mapping each data event of the multiple data events to the API template, extracting different instances of event content from the multiple data events, and populating each API call of the multiple API calls with a respective instance of extracted event content according to a content pattern specified by the API template; and
communicating, by the at least one processing device, the multiple API calls to the API system to cause multiple actions to be executed by the API system based on different respective requests from the multiple data events.

8. A method as described in claim 1, wherein said receiving further comprises receiving multiple data events including the data event that each include a request to perform a respective action, and wherein the method further comprises:
generating, by the at least one processing device, the API call by mapping each data event of the multiple data events to the API template, extracting different instances of event content from the multiple data events, and populating the API call with the instances of extracted event content according to a content pattern specified by the API template; and
communicating, by the at least one processing device, the API call to the API system to cause the action to be executed by the API system based on the instances of extracted event content from the multiple data events.

9. A system comprising:
a mediator module implemented at least partially in hardware of at least one processing device to receive a data event that includes a request to perform an action and event content for the action including parameters for the data event;

a template selector module implemented at least partially in hardware of at least one processing device to identify an application programming interface (API) template for the request by comparing one or more attributes of the data event to the API template from a set of API templates, the one or more attributes of the data event including the parameters for the data event that include a type of a request, an entity that generated the request, and a content type; and an applicator module implemented at least partially in hardware of at least one processing device to generate an API call including to map the data event to the API template, extract the event content from the data event, and populate the API call with the extracted event content by arranging the extracted event content according to a content pattern specified by the API template, wherein the mediator module is further implemented to communicate the API call to an API system to cause an action to be executed by the API system based on the request from the data event, wherein:

the mediator module is further implemented to receive an API response from the API system that specifies a result of execution of the action by the API system and an indication of a successful API call or an API call failure;

the applicator module is further implemented to generate a response event by mapping the API response to a response template to populate the response event with API content specifying the result of execution of the action by the API system based on the indication; and the mediator module is further implemented to communicate the response event to an event system from which the data event was received.

10. A system as described in claim 9, wherein the one or more attributes of the data event comprise an identity of an API to be called by the API call.

11. A system as described in claim 9, wherein the API template includes multiple subtemplates that each correspond to a different section of the API call and specify which event content from the data event is to be populated to a respective section of the API call, and wherein to generate the API call includes to apply the subtemplates to the event content.

12. A system as described in claim 9, wherein the API template specifies a function to be performed on at least a portion of the event content, and to generate the API call comprises implementing the applicator module to:

execute the function on the at least a portion of the event content to generate transformed event content; and
populate the transformed event content to the API call.

13. A system as described in claim 9, wherein the API template specifies additional content not included in the data event that is to be included in the API call, and wherein to generate the API call comprises implementing the applicator module to populate the additional content to the API call.

14. One or more computer-readable storage media having instructions stored that, responsive to execution by a processing device, causes the processing device to perform operations comprising:

generating an API call by:
mapping a data event to an API template of a set of API templates by comparing one or more attributes of the data event to one or more attributes of the API template from a set of API templates, the one or more attributes of the data event including parameters for the data event that include a type of a request, an entity that generated the request, and a content type;
extracting event content from the data event; and
populating the API call with the extracted event content by arranging the extracted event content according to a content pattern specified by the API template;

communicating the API call to an API system to cause an action to be executed by the API system based on the data event;

receiving an API response from the API system that specifies a result of execution of the action by the API system and an indication of a successful API call or an API call failure;

generating a response event by mapping the API response to a response template to populate the response event with API content specifying the result of execution of the action by the API system based on the indication; and communicating the response event to an event system from which the data event was received, wherein said receiving further comprises receiving multiple data events including the data event that each include a request to invoke the API, and wherein the operations further comprise:

generating multiple API calls by mapping each data event of the multiple data events to the API template, extracting different instances of event content from the multiple data events, and populating each API call of the multiple API calls with a respective instance of extracted event content according to a content pattern specified by the API template; and communicating the multiple API calls to the API system to cause multiple actions to be executed by the API system based on different respective requests from the multiple data events.

15. One or more computer-readable storage media of claim 14, wherein the API template includes multiple subtemplates that each correspond to a different section of the API call and specify which event content from the data event is to be populated to a respective section of the API call, and wherein said generating the API call is based on applying the subtemplates to the event content.

16. One or more computer-readable storage media of claim 14, wherein the API template includes multiple subtemplates that each correspond to a different section of the API response and specify which response content from the API response is to be populated to a respective section of the response event, and wherein said generating the response event is based on applying the subtemplates to the response content.

17. One or more computer-readable storage media of claim 14, wherein the API template specifies a function to be performed on at least a portion of the event content, and wherein said generating the API call comprises executing the function on the at least a portion of the event content to generate transformed event content and populating the transformed event content to the API call.

18. One or more computer-readable storage media of claim 14, wherein the set of API templates includes multiple different API templates for multiple different APIs, and wherein said mapping the data event to the API template of the set of API templates is based at least in part on an identity of an API to be called by the API call.

19. One or more computer-readable storage media of claim 14, wherein the API template specifies which portions of the extracted event content are to be populated to the API call according to the content pattern.

20. One or more computer-readable storage media of claim 14, wherein said generating the API call further comprises determining an identity of an API to be called by the API call.

\* \* \* \* \*